(12) United States Patent
Gera et al.

(10) Patent No.: US 10,862,795 B2
(45) Date of Patent: Dec. 8, 2020

(54) PROVISIONING RECOVERY PATHS IN A MESH NETWORK

(71) Applicant: Fujitsu Limited, Kanagawa (JP)

(72) Inventors: Sanjay Gera, Plano, TX (US); Fredrick Gruman, Plano, TX (US); David Traylor, Allen, TX (US); Cong Deng, Plano, TX (US); Abinder Dhillon, Allen, TX (US); Catherine Yuan, Plano, TX (US); Jun Chen, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 38 days.

(21) Appl. No.: 16/242,707

(22) Filed: Jan. 8, 2019

(65) Prior Publication Data

US 2020/0220806 A1    Jul. 9, 2020

(51) Int. Cl.
| | |
|---|---|
| *H04L 12/703* | (2013.01) |
| *H04L 12/24* | (2006.01) |
| *H04Q 11/00* | (2006.01) |
| *H04L 12/709* | (2013.01) |
| *H04L 12/707* | (2013.01) |
| *H04W 84/18* | (2009.01) |

(52) U.S. Cl.
CPC .......... *H04L 45/28* (2013.01); *H04L 41/0806* (2013.01); *H04L 45/22* (2013.01); *H04L 45/245* (2013.01); *H04Q 11/0062* (2013.01); *H04Q 2011/0081* (2013.01); *H04W 84/18* (2013.01)

(58) Field of Classification Search
CPC ..... H04L 45/28; H04L 41/0806; H04L 45/22; H04L 45/245; H04Q 11/0062; H04Q 2011/0081; H04W 84/18
See application file for complete search history.

(56) References Cited

U.S. PATENT DOCUMENTS

| | | | | |
|---|---|---|---|---|
| 2009/0310960 | A1* | 12/2009 | Xu | H04J 14/0227 398/4 |
| 2015/0188624 | A1* | 7/2015 | Syed | H04B 10/032 398/5 |
| 2015/0215200 | A1* | 7/2015 | Bottari | H04Q 3/0079 370/228 |

* cited by examiner

*Primary Examiner* — Dady Chery
(74) *Attorney, Agent, or Firm* — Baker Botts L.L.P.

(57) ABSTRACT

A system and method for of pre-provisioning recovery paths in a mesh network including creating i) a working path between a head end NE and a tail end NE of the mesh network and ii) a recovery path between the head end NE and the tail end NE, wherein the working path and the recovery path include one or more intermediate NEs; provisioning the working path in an activated state, including establishing cross connects of each of the NEs of the working path; provisioning the recovery path in a pending state, including establishing cross connects of each of the NEs of the recovery path; after provisioning the recovery path, detecting a failure along the working path, and in response, allocating and reserving link resources along the recovery path; and activating, by the NEs along the recovery path, cross connects of the recovery path into respective hardware associated with the NEs.

12 Claims, 6 Drawing Sheets

PROVISIONING RECOVERY PATHS IN A MESH NETWORK

BACKGROUND

Field of the Disclosure

The present disclosure relates generally to provisioning recovery paths in a mesh network

Description of the Related Art

Telecommunications systems, cable television systems and data communication networks use optical transport networks (OTN) to rapidly convey large amounts of information between remote points. In such networks, information is conveyed in the form of optical signals through optical fibers.

A mesh network is a local network topology in which the infrastructure nodes (e.g., bridges, switches and other infrastructure devices) connect directly, dynamically and non-hierarchically to other nodes and cooperate with one another to efficiently route data from/to clients. This allows for every node to participate in the relay of information. The optical network can include a mesh network. However, during failures of the mesh network, e.g. a single fiber cut, restoration of services of the mesh network can take minutes by a controller interfacing with each node of the mesh network including establishing new cross connects and removing previous cross connects. However, it is desired to have restoration of services in the hundreds of milliseconds (e.g., less than 500 milliseconds) as opposed to the minutes it currently takes.

SUMMARY

Innovative aspects of the subject matter described in this specification may be embodied in methods for pre-provisioning recovery paths in a mesh network, including creating, by a controller computing module, i) a working path between a head end network element (NE) and a tail end NE of the mesh network and ii) a recovery path between the head end NE and the tail end NE, wherein the working path and the recovery path include one or more intermediate NEs; provisioning, by the controller computing module, the working path in an activated state, including establishing cross connects of each of the NEs of the working path; provisioning, by the controller computing module, the recovery path in a pending state, including establishing cross connects of each of the NEs of the recovery path; configuring, by the controller computing module, a pool of link resources for each link between the NEs; after provisioning the recovery path, detecting, by the head end NE, a failure along the working path; in response to detecting the failure along the working path, allocating and reserving, by the head end NE, link resources along the recovery path based on the pool of link resources for each link between the NEs of the recovery path; and activating, by the NEs along the recovery path, cross connects of the recovery path into respective hardware associated with the NEs, wherein the activating is independent of the controller computing module interaction.

Other embodiments of these aspects include corresponding systems, apparatus, and computer programs, configured to perform the actions of the methods, encoded on computer storage devices.

These and other embodiments may each optionally include one or more of the following features. For instance, creating, by the controller computing module and using the pool of link resources, multiple recovery paths between the head end NE and the tail end NE. Assigning the pool of link resources further includes oversubscribing the pool of link resources based on a network failure analysis. In response to establishing the cross connects of each of the NEs of the working path, activating, by each of the NEs along the working path, cross connects of the working path into respective hardware associated with the NEs. In response to establishing the cross connects of each of the NEs of the recovery path, storing, by each of the NEs along the recovery path, data indicating the cross connects into memory associated with the NEs. Allocating and reserving the link resources along the recovery path further includes transmitting, by the head end NE, an activation message on an outgoing link of the cross connect to a particular intermediate NE along the recovery path, the activation message including proposed link resources; receiving, by the particular intermediate NE, the activation message, and in response, determining an availability of the proposed link resources; transmitting, by the particular intermediate node, the activation message to the tail end NE; receiving, by the tail end NE, the activation message, and in response, providing, to the particular intermediate node, an activation success message; receiving, by the particular intermediate node, the activation success message, and in response, providing the activation success message to the head end NE; receiving, by the head end NE, the activation success message; and activating, by the NEs along the recovery path, the cross connects of the recovery path into respective hardware associated with the NEs.

Innovative aspects of the subject matter described in this specification may be embodied in a system for pre-provisioning recovery paths in a mesh network, the system comprising a controller computing module configured to: create i) a working path between a head end network element (NE) and a tail end network element of the mesh network and ii) a recovery path between the head end NE and the tail end NE, wherein the working path and the recovery path include one or more intermediate NEs; provision the working path in an activated state, including establishing cross connects of each of the NEs of the working path; provision the recovery path in a pending state, including establishing cross connects of each of the NEs of the recovery path; configure a pool of link resources for each link between the NEs; the head end NE configured to: after provisioning the recovery path, detect a failure along the working path; in response to detecting the failure along the working path, allocating and reserving link resources along the recovery path based on the pool of link resources for each link between the NEs of the recovery path; and wherein each of the NEs along the recovery path activate the cross connects of the recovery path into respective hardware associated with the NEs, wherein the activating is independent of the controller computing module interaction.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

For a more complete understanding of the present invention and its features and advantages, reference is now made to the following description, taken in conjunction with the accompanying drawings, in which.

DESCRIPTION OF THE EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

Figure 1:
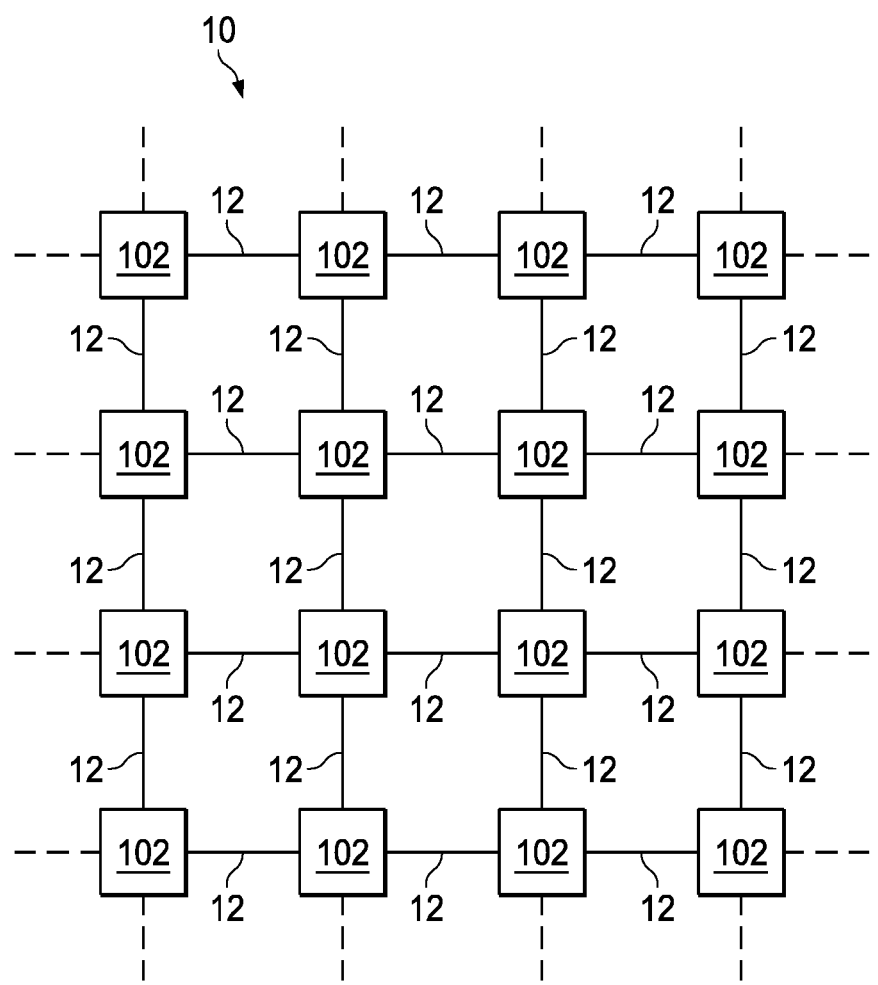
FIG. 1 is a block diagram of an example network.

FIG. 1 illustrates a block diagram of an example network 10, in accordance with certain embodiments of the present disclosure. Network 10 may include one or more links 12 operable to transport one or more signals communicated by components of network 10. The components of network 10, coupled together by links 12, may include a plurality of network elements 102. In the illustrated network 10, each network element 102 is coupled to four other nodes. However, any suitable configuration of any suitable number of network elements 102 may create network 10.

Each link 12 may include any system, device, or apparatus configured to communicatively couple network devices 102 to each other and communicate information between corresponding network devices 102. For example, a transmission medium 12 may include an optical fiber, an Ethernet cable, a Ti cable, a WiFi signal, a Bluetooth signal, or other suitable medium.

Network 10 may communicate information or "traffic" over links 12. As used herein, "traffic" means information transmitted, stored, or sorted in network 10. Such traffic may comprise optical or electrical signals configured to encode audio, video, textual, and/or any other suitable data. The data may also be real-time or non-real-time. Traffic may be communicated via any suitable communications protocol, including, without limitation, the Open Systems Interconnection (OSI) standard and Internet Protocol (IP). Additionally, the traffic communicated in network 10 may be structured in any appropriate manner including, but not limited to, being structured in frames, packets, or an unstructured bit stream.

Each network element 102 in network 10 may comprise any suitable system operable to transmit and receive traffic. In the illustrated embodiment, each network element 102 may be operable to transmit traffic directly to one or more other network elements 102 and receive traffic directly from the one or more other network elements 102. Network elements 102 will be discussed in more detail below with respect to FIG. 2.

Modifications, additions, or omissions may be made to network 10 without departing from the scope of the disclosure. The components and elements of network 10 described may be integrated or separated according to particular needs. Moreover, the operations of network 10 may be performed by more, fewer, or other components.

Figure 2:
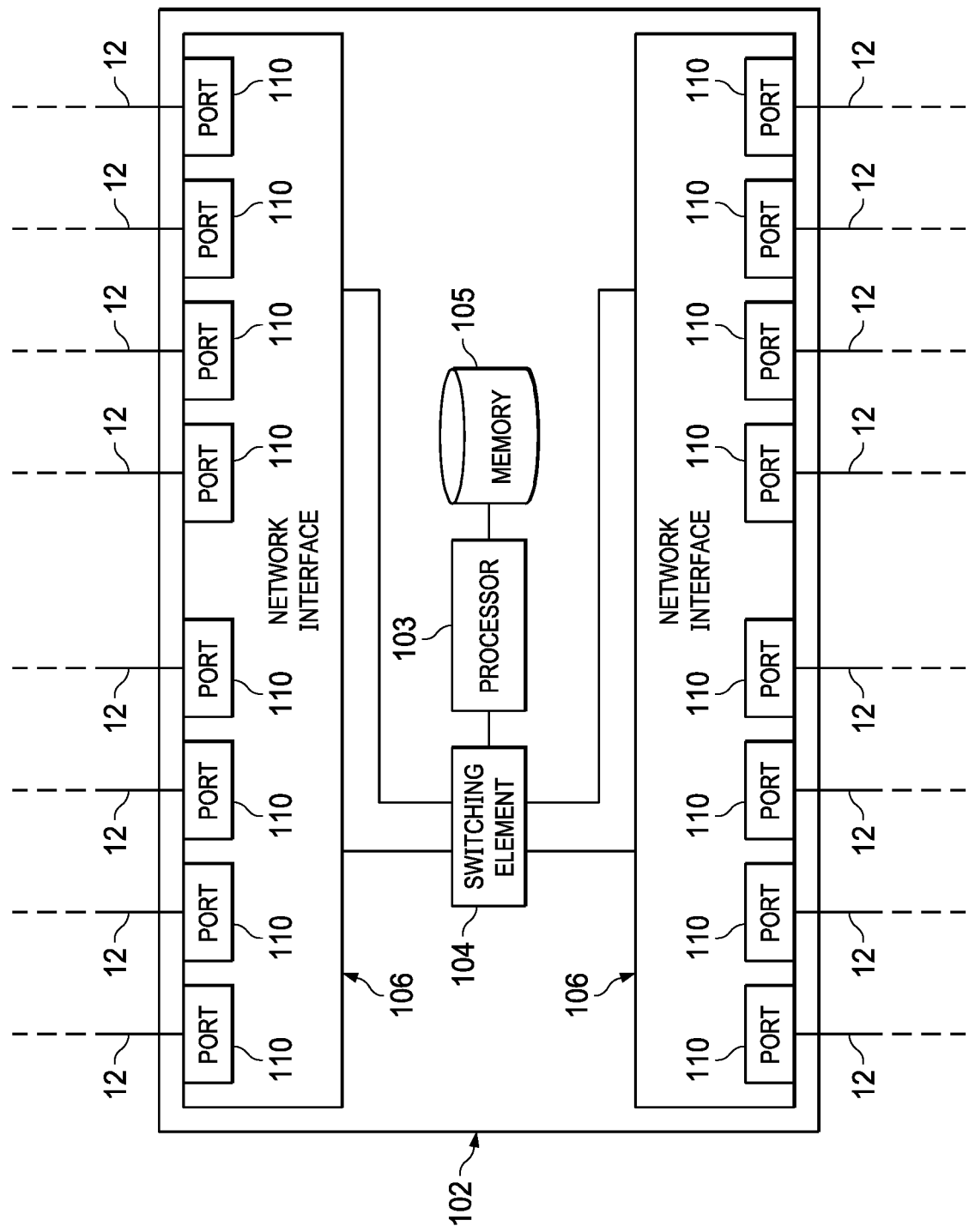
FIG. 2 is a block diagram of an example network element.

FIG. 2 illustrates a block diagram an example network element 102, in accordance with certain embodiments of the present disclosure. As discussed above, each network element 102 may be coupled to one or more other network elements 102 via one or more links 12. In some embodiments, however, not all network elements 102 may be directly coupled as shown in FIG. 2. Each network element 102 may generally be configured to receive data from and/or transmit data to one or more other network elements 102. In certain embodiments, network element 102 may comprise a switch or router configured to transmit data received by network element 102 to another device (e.g., another network element 102) coupled to network element 102.

As depicted in FIG. 2, network element 102 may include a processor 103, a memory 105, a switching element 104, and one or more network interfaces 106 communicatively coupled to switching element 104.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 105 and/or another component of network element 102. Although FIG. 2 depicts processor 103 as a component independent from network interfaces 106, in some embodiments one or more processors 103 may reside on network interfaces 106 and/or other components of a network element 102.

Memory 105 may be communicatively coupled to processor 103 and may include any system, device, or apparatus configured to retain program instructions and/or data for a period of time (e.g., computer-readable media). Memory 105 may include random access memory (RAM), electrically erasable programmable read-only memory (EEPROM), a PCMCIA card, flash memory, magnetic storage, opto-magnetic storage, or any suitable selection and/or array of volatile or non-volatile memory that may retain data after power to network element 102 is turned off. Although FIG. 2 depicts memory 105 as independent from network interfaces 106, in some embodiments one or more memories 105 may reside on network interfaces 106 and/or other components of network element 102.

Switching element 104 may include any suitable system, apparatus, or device configured to receive traffic via a network interface and forward such traffic to a particular network interface 106 and/or port 110 based on analyzing the contents of the datagrams carrying the traffic and/or based on a characteristic of a signal carrying the datagrams (e.g., a wavelength and/or modulation of the signal). For example, in certain embodiments, a switching element 104 may include a switch fabric (SWF). Each network interface 106 may be communicatively coupled to switching element 104 and may include any suitable system, apparatus, or device configured to serve as an interface between a network element 102 and a link 12. Each network interface 106 may enable its associated network element 102 to communicate to other network elements 102 using any suitable transmission protocol and/or standard. Network interface 106 and its various components may be implemented using hardware, software, or any combination thereof. For example, in certain embodiments, one or more network interfaces 106 may include a network interface card. In the same or alternative embodiments, one or more network interfaces 106 may include a line card. In these and other embodiments, one or more network interfaces may include a network processing unit (NPU). In an embodiment where network 10 is an optical network, one or more network interfaces may include an Optical Transport Network (OTN), Wavelength Division Multiplexing (WDM) or Packet/Ethernet line cards.

As depicted in FIG. 2, each of network interfaces 106 may include one or more physical ports 110. Each physical port 110 may include any system, device or apparatus configured to serve as a physical interface between a corresponding link 12 and network interface 106. For example, a physical port 110 may comprise an Ethernet port, an optical port, or any other suitable port. In some embodiments, physical ports 110 may be provisioned in a redundancy scheme, such that one or more ports 110 may be designated as "working" or "active" paths for communicating traffic while other ports 110 may be designated as redundant "protection" or "standby" paths which may be employed in the event of a link failure or other failure of a "working" or "active" path. For example, a plurality of ports 110 may be member ports of a link aggregation group in accordance with IEEE standard 802.1AX-2008 or another suitable redundancy scheme.

Figure 3:
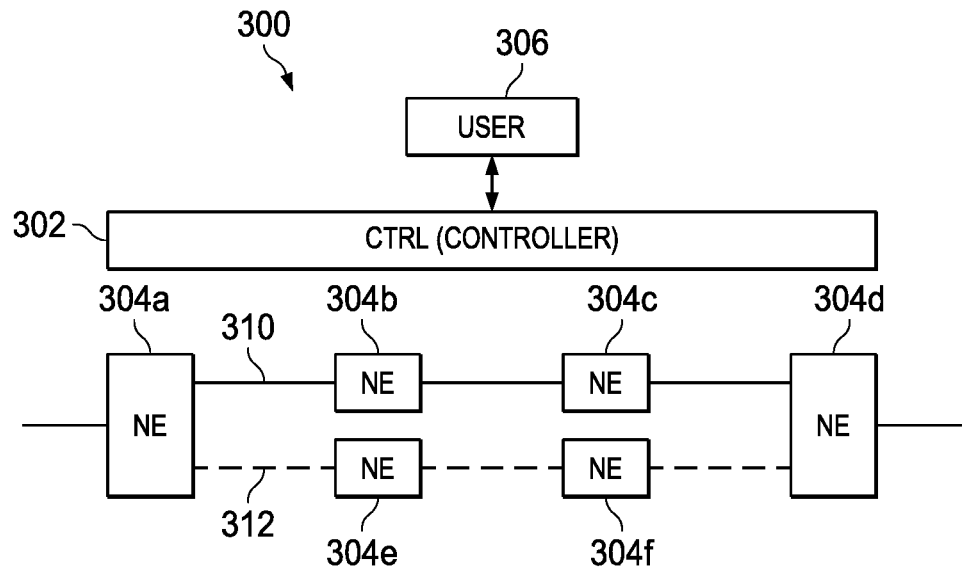
FIGS. 3, 4 are block diagrams of a mesh network.
Figure 6:
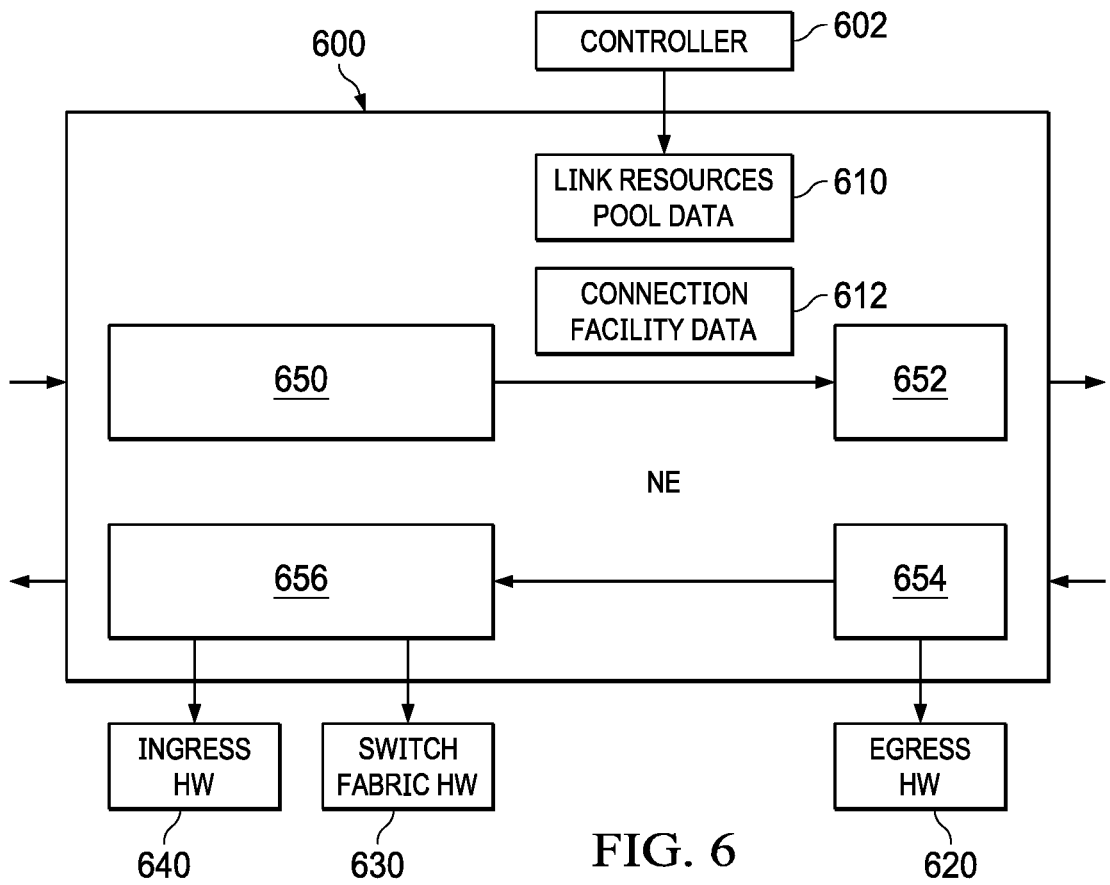
FIG. 6 is an illustration of a network element for a two-pass signaling protocol.

FIG. 3 illustrates a mesh network 300. In some examples, the network 10 of FIG. 1 can include the mesh network 300. The mesh network 300 can include a controller 302 and a plurality of network elements (NE) 304a, 304b, 304c, 304d, 304e, 304f (collectively referred to as NEs 304). The NEs 304 can be similar to the network elements 102 of FIG. 2 and/or the network element (NE) 600 as illustrated in FIG. 6. Specifically, the NE 600 can include ingress network interfaces 650, 654 and egress network interfaces 652, 656, similar to network interfaces 106 of FIG. 2.

To that end, a user computing system 306 can be in communication with the controller 302. The mesh network 300, and specifically, the controller 302, can pre-provision a recovery path in the network 300 to minimize, if not avoid, additional communication steps between the controller 302 and the NEs 304 such that the NEs can execute a recovery path activation at a time of a failure event, described further herein.

In the illustrated example, the user computing system 306 can request dynamically protected service from NE 304a to NE 304d. In response, the controller 302 creates a working path between the NE 304a and the NE 304d. In some examples, the NE 304a can be referred to as a head end NE and the NE 304d can be referred to as a tail end NE. Specifically, the controller 306 can calculate a working path 310 between the NEs 304a, 304d including selection/identification of links and link resources (e.g., timeslots) therebetween for the working path 310 (e.g., service planning). In the illustrated example, the controller 304 performs the path computation for the working path 310 to include NE 302a, 302b, 302c, 302d. The working path 310 can also include a first connection ID (network unique identifier).

Additionally, the controller 302 creates a recovery path between the NE 304a and the NE 304d. Specifically, the controller 302 can calculate a recovery path 312 between the NEs 304a, 304d including selection/identification of links therebetween for the recovery path 312 (link resources not explicitly identified). In the illustrated example, the controller 304 performs the path computation for the recovery path 312 to include NEs 302a, 302e, 302f, 302d. The recovery path can also include a second connection ID (network unique identifier).

In some implementations, the controller 302 provisions the working path 310 in an activated state, including establishing cross connects of each of the NEs 304a, 304b, 304c, 304d of the working path 310. That is, the controller 302 provisions the working path 310, including link resources, in an activated state; and establishes cross connects of the NEs 304a, 304b, 304c, 304d along the working path 310. Each of the NEs 304a, 304b, 304c, 304d activates cross connects of the working path 310 into respective hardware associated with the NEs 304a, 304b, 304c, 304d. In other words, the NEs 304a, 304b, 304c, 304d install the cross connects in respective hardware (data plane), and a result, network traffic can be submitted across the working path 310.

Specifically, for each the NEs 304a, 304b, 304c, 304d along the working path 310 that is similar to the NE 600 of FIG. 6, the NE 600 receives an activation request with a service ID at the ingress network interface 650 (e.g., from another NE 600), including proposed link resources. The NE 600, in response, can locate a connection, find a pending facility of the cross connect from the connection facility data 612, allocate link resources based on the proposed link resources of the activation request, mark the facility reserved, and forward the same to an egress network interface 652. At the egress network interface 652, in response to the activation request, the NE 600 can locate the pending facility, allocate the link resources from the link resources pool data 610, mark the facility as reserved, and forward the activation message over an outgoing link (e.g., to another NE 600). The activation message can include proposed link resources.

Further, the NE 600 can receive an activation success message at an ingress network interface 654 (e.g., from another NE 600), including accepted link resources and a service ID. To that end, the NE 600 can, in response, find a pending facility of the cross connect, allocate the link resources, mark such as allocated, push the facility to hardware (shown as egress hardware 620), and forward the message to an egress network interface 656. At the egress network interface 656 of the NE 600, the NE 600 can find the reserved facility, mark the facility as activated (shown as switch fabric hardware 630), push the cross connect to hardware (shown as ingress hardware 640), and forward the message over the outgoing link (e.g., the activation success message with the accepted link resources and service ID to another NE 600).

In some implementations, the controller 302 can provision the recovery path 312 in a pending state, including establishing cross connects of each of the NEs 304a, 304e, 304f, 304d. That is, the controller 302 provisions the recovery path 312 without assigning/allocating link resources and without installing the cross connects in the respective hardware (data plane). In some examples, the controller 302 provisions the recovery path 312 prior to any failures of the mesh network 300 and/or the working path 310.

In some examples, the NEs 304a, 304e, 304f, 304d of the recovery path 312 store data indicating the cross connects into respective memory associated with the NEs 304a, 302e, 302f, 302d. The NEs 304a, 304e, 304f, 304d of the recovery path 312 can store such in memory such that the cross connects are able to be installed in respective hardware in a timely manner (e.g., 3-5 milliseconds). In some examples, the NEs 304a, 304e, 304f, 304d store the data indicating the cross connects in response to establishing the cross connects of each of the NEs 304a, 304e, 304f, 304d of the recovery path 312.

In some examples, the controller 302 can assign a pool of links resources for each link between the NEs 304 of the mesh network 300. Further, the controller 302 can create, using the pool of link resources, multiple recovery paths between the NE 304a and NE 304d. Specifically, the controller 302 can establish the recovery pool of links based on policies established by the user computing system 306.

Specifically, the controller 302 calculates the recovery resource pool that can be used at the time of activation of the recovery path 312, described further herein. The controller 302 can assign a pool of link resources on each link by the controller 302—e.g., OTN: TPN/TS, PACKET: VLAN, WDM: LAMBDA. The controller 302 can then create multiple recovery paths using the pool of link resources. The controller 302 can consider account oversubscription to allow for enough resources to handle a single network link failure. To that end, the controller 302 can size the pool of link resources and oversubscription based on a network failure analysis.

Figure 4:
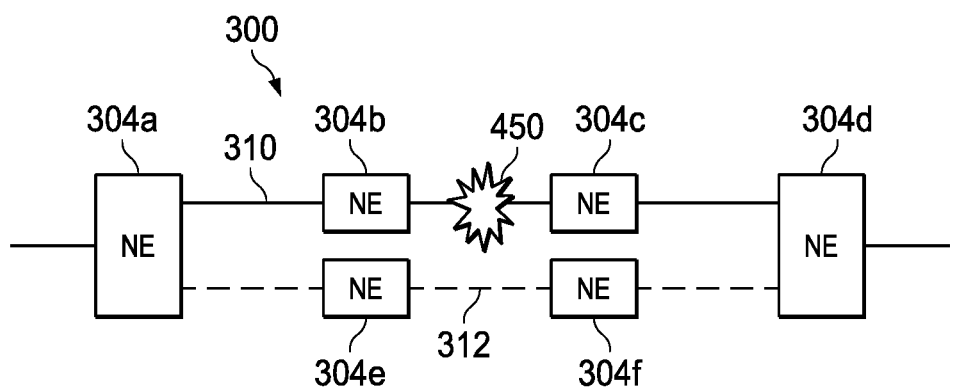

Referring to FIG. 4, the mesh network 300 is shown after a failure 450 between NE 304b and NE 304c—e.g., a fiber cut. In some implementations, the NE 304a can detect the failure 450 along the working path 310—e.g., between NE 304b and NE 304c (active connection). That is, after provisioning of the recovery path 312, the NE 304a can detect the failure 450 along the working path 310. In response to detecting the failure along the working path 310, the NE 304a can allocate and reserve the link resources along the recovery path 312. Specifically, upon detection of the failure event, the appropriate link resources are assigned, reserved, and activated.

In some examples, allocating and reserving the link resources by the NE 304a along the recovery path 312 can include transmitting, by the NE 304a, an activation message on an outgoing link of the cross connect to the NE 304e along the recovery path 312. The activation message can include proposed link resources. For example, referring to FIG. 6, the NE 600, which is similar to the NE 304a, at the egress network interface 652, can transmit the activation message over an outgoing link to the NE 304e.

The NE 304e can receive the activation message. For example, referring to FIG. 6, the NE 600, which is similar to the NE 304e, can receive the activation message at the ingress network interface 650. The NE 304e, in response, can determine an availability of the proposed link resources. That is, the NE 304e can ensure that the proposed link resources are available. In some examples, the NE 304e can determine that the proposed link resources are not available, the NE 304e can handle an exception, and send an activation failure. In some examples, the NE 304e can transmit the activation message on an outgoing link of the cross connect to the NE 304f along the recovery path 312. Referring to FIG. 6, the NE 600, which is similar to the NE 304e, at the egress network interface 652, can transmit the activation message over an outgoing link to the NE 304f.

The NE 304f can receive the activation message. For example, referring to FIG. 6, the NE 600, which is similar to the NE 304f, can receive the activation message at the ingress network interface 650. The NE 304f, in response, can determine an availability of the proposed link resources. That is, the NE 304f can ensure that the proposed link resources are available. In some examples, the NE 304f can determine that the propose link resources are not available, the NE 304f can handle an exception, and send an activation failure. In some examples, the NE 304f can transmit the activation message on an outgoing link of the cross connect to the NE 304d along the recovery path 312. Referring to FIG. 6, the NE 600, which is similar to the NE 304f, at the egress network interface 652, can transmit the activation message over an outgoing link to the NE 304d.

The NE 304d can receive the activation. For example, referring to FIG. 6, the NE 600, which is similar to the NE 304d, can receive the activation message at the ingress network interface 650. In response, the NE 304d can provide to the NE 304f an activation success message. For example, at the egress network interface 656, can transmit the activation message over an outgoing link to the NE 304f.

The NE 304f can receive the activation success message (e.g., at an ingress network interface 654) and transmit the same to the NE 304e (e.g., at an egress network interface 656). The NE304e can receive the activation success message (e.g., at an ingress network interface 654) and transmits the same to the NE 304a (e.g., at an egress network interface 656). The NE 304a can receive the activation success message (e.g., at an ingress network interface 654).

Each of the NEs 304a, 304e, 304f, 304d along the recovery path 312 can activate the cross connects of the recovery path 312 into respective hardware associated with the NEs 304a, 304e, 304f, 304d. That is, the cross connects are installed in the data plane hardware of the respective NEs 304a, 304e, 304f, 304d. In some examples, the cross connects are activated into respective hardware associated with the NEs 304a, 304e, 304f, 304d independent of the controller 302. That is, the cross connects are activated into respective hardware associated with the NEs 304a, 304e, 304f, 304d without interaction by the controller 302. In some examples, the NEs 304a, 304e, 304f, 304d along the recovery path 312 can activate the cross connects of the recovery path 312 into respective hardware associated with the NEs 304a, 304e, 304f, 304d after receiving the activation success message.

Figure 5:
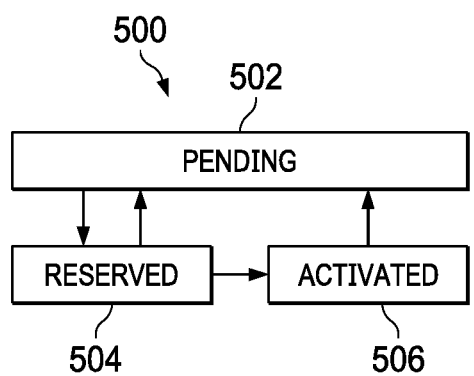
FIG. 5 is an illustration of a state machine for management of cross connects within the mesh network.

FIG. 5 illustrates a state diagram 500 of management of cross connects within the mesh network 300. Specifically, in a first state 502, end points of the cross connects are identified. Further, the specific link resources are not allocated in state 502; and the cross connects are not pushed into respective hardware of the NEs 304 of the recovery path 312 in state 502. In a second state 504, the link resources are allocated and reserved. However, the cross connects are not pushed into respective hardware of the NEs 304 of the recovery path 312 in state 504. In a third state 506, the cross connects are pushed into respective hardware of the NEs 304 of the recovery path 312.

Figure 7:
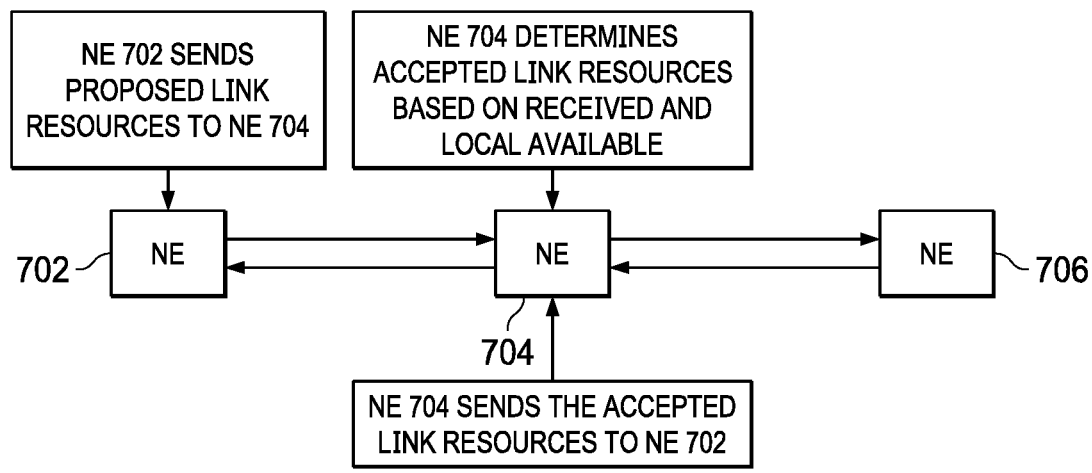
FIGS. 7, 8 illustrate allocation modes of a mesh network.

In some examples, the mesh network 300 can support differing allocation modes. Specifically, in a first mode, the link resources are provided explicitly by the controller 302 to each of the NEs 304 for each recovery cross connect. In a second mode, for a packet-based network, or time division multiplexed optical transport network (OTN), link resources are per span and allocated by neighboring nodes on a link. Specifically, FIG. 7 illustrates an environment 700 that link resources only need to match between individual NEs, and do not have to match end-to-end. For example, NE 702 can send proposed link resources, e.g., time slot information, to the NE 704; the NE 704 can determine the accepted link resources, e.g., open timeslot, based on the received link resources and locally available resources; and the NE 704 can send the accepted link resources to the NE 702.

Figure 8:
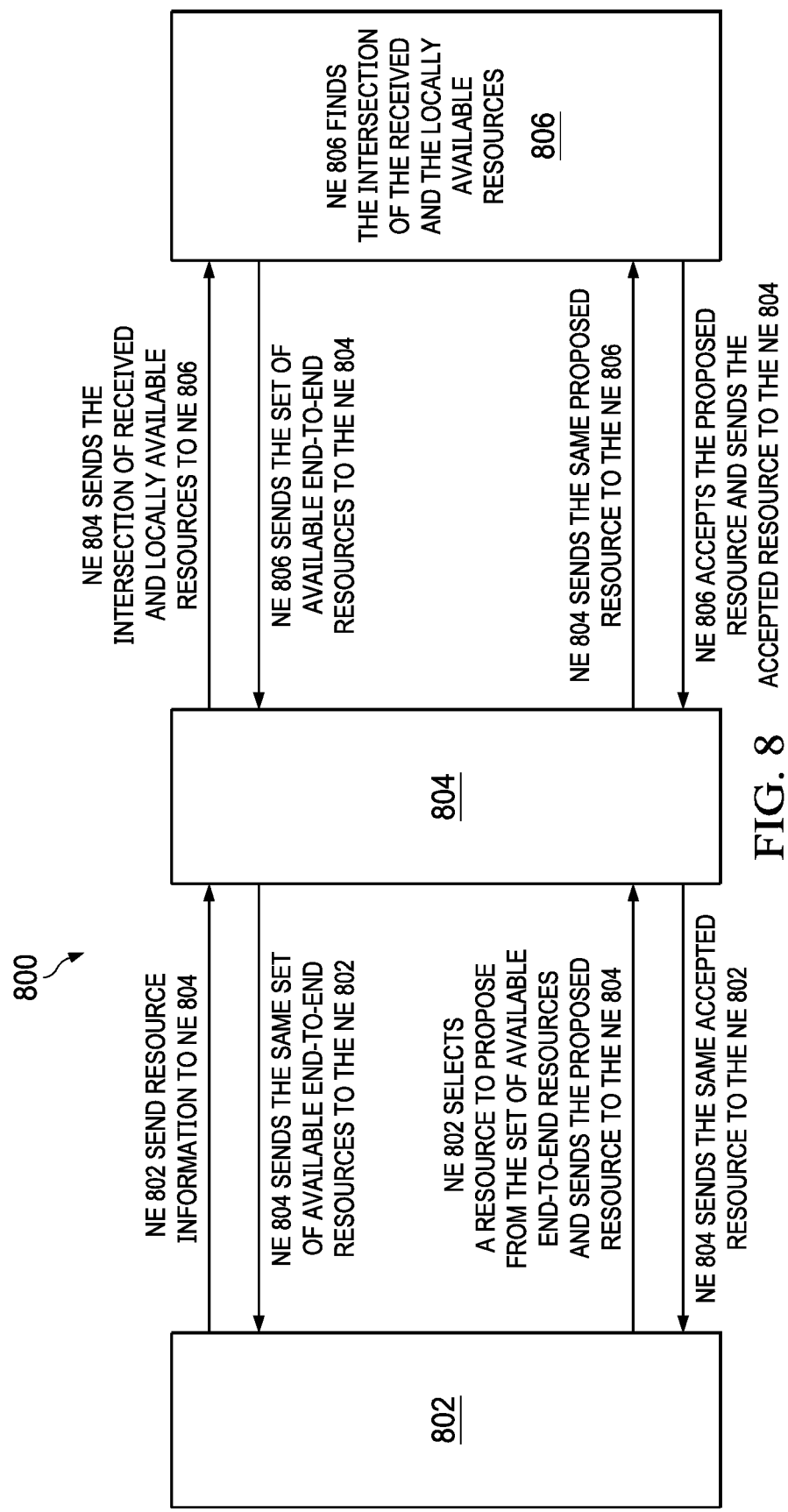

In a third mode, for wavelength-division multiplexing (WDMN), link resources are unique end-to-end, and thus, the protocol iterates from head-end NE to tail-end NE to find the set of available resources (e.g., lambdas) that are available end-to-end in the first two-way pass. Then the head end NE will select a specific resource (e.g., a specific lambda) to propose and the tail end NE will accept or reject the proposal in the second two-way pass. Specifically, FIG. 8 illustrates an environment 800 that include resources that are the same from end-to-end. For example, NE 802 can send available resource information to the NE 804; the NE 804 can send the intersection of the received and the locally available resources to the NE 806; the NE 806 finds the set of intersection of the received and the locally available resources, and finds the set of available end-to-end resources; the NE 806 can send the set of available end-to-end resources to the NE 804; and the NE 804 can send the same set of available end-to-end resources to the NE 802. NE 802 can then select a resource to propose from the set of available end-to-end resources and send the proposed resource to the NE 804. The NE 804 can send the same propose resource to the NE 806. The NE 806 can then accept the proposed resource and send the accepted resource to the NE 804; and the NE 804 can send the same accepted resource to NE 802.

In some examples, referring back to FIG. 3, the controller 302 can further perform reversion and de-activation of recovery resources after the network failure 450 has been repaired (e.g., the working path 310). The controller 302 can further reset the state machine providing the state diagram 500 of FIG. 5 to allow re-activation in case of future network failures of the mesh network 300. The controller 302 can further reroute the recovery path (e.g., the recovery path 312) after network failure on unaffected services (if their recovery resources were active and taken by another service). The controller 302 can further handle failure handling and cleanup of partially reserved/activated recovery resources (partially provisioned) and/or perform backup dynamic restoration. The controller 302 can further handle service deactivation including de-provisioning of working and recovery paths, reducing the recovery resource pool.

Figure 9:
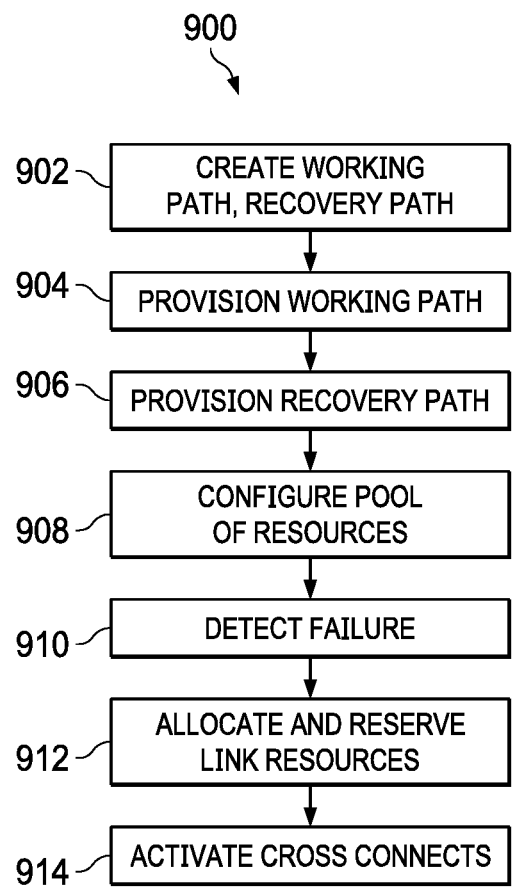
FIG. 9 is a flowchart illustrating provisioning of recovery paths in a mesh network

FIG. 9 illustrates a flowchart depicting selected elements of an embodiment of a method 900 for provisioning recovery paths in a mesh network. The method 900 may be performed by the network management system 200, the controller 302, and/or the NEs 304 with reference to FIGS. 1-8. It is noted that certain operations described in method 900 may be optional or may be rearranged in different embodiments.

At 902, the controller 302 creates the working path 310 between the head end NE 304*a* and the tail end NE 304*d* of the mesh network 300. Further, the controller 302 creates the recovery path 312 between the head end NE 304*a* and the tail end NE 304*d*. In some examples, the working path 310 and the recovery path 312 include one or more intermediate NEs 304. At 904, the controller 302 provisions the working path 310 in an activated state, including establishing cross connects of each of the NEs 304 of the working path 310. At 906, the controller 302 provisions the recovery path 312 in a pending state, including establishing cross connects of each of the NEs 304 of the recovery path 312. At 908, the controller 302 configures a pool of link resources for each link between the NEs 304. At 910, after provisioning the recovery path and configuring the pool of link resources, the head end NE 304*a* detects a failure along the working path 310. At 912, in response to detecting the failure along the working path 310, the head end 304*a* allocates and reserves link resources along the recovery path 312 based on the pool of link resources for each link between the NEs of the recovery path. At 914, each of the NEs 304 along the recovery path 312 activate cross connects of the recovery path 312 into respective hardware associated with the NEs 304. In some examples, the activating is independent of interaction by the controller 302.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method of pre-provisioning recovery paths in a mesh network, the method comprising:

creating, by a controller computing module, i) a working path between a head end network element (NE) and a tail end NE of the mesh network and ii) a recovery path between the head end NE and the tail end NE, wherein the working path and the recovery path include one or more intermediate NEs;

provisioning, by the controller computing module, the working path in an activated state, including establishing cross connects of each of the NEs of the working path;

provisioning, by the controller computing module, the recovery path in a pending state, including establishing cross connects of each of the NEs of the recovery path;

configuring, by the controller computing module, a pool of link resources for each link between the NEs;

after provisioning the recovery path, detecting, by the head end NE, a failure along the working path;

in response to detecting the failure along the working path, allocating and reserving, by the head end NE, link resources along the recovery path based on the pool of link resources for each link between the NEs of the recovery path, wherein allocating and reserving the link resources along the recovery path further includes:

transmitting, by the head end NE, an activation message on an outgoing link of the cross connect to a particular intermediate NE along the recovery path, the activation message including proposed link resources;

receiving, by the particular intermediate NE, the activation message, and in response, determining an availability of the proposed link resources;

transmitting, by the particular intermediate node, the activation message to the tail end NE;

receiving, by the tail end NE, the activation message, and in response, providing, to the particular intermediate node, an activation success message;

receiving, by the particular intermediate node, the activation success message, and in response, providing the activation success message to the head end NE; and receiving, by the head end NE, the activation success message; and activating, by the NEs along the recovery path, cross connects of the recovery path into respective hardware associated with the NEs, wherein the activating is independent of the controller computing module interaction.

2. The computer-implemented method of claim 1, further comprising:

creating, by the controller computing module and using the pool of link resources, multiple recovery paths between the head end NE and the tail end NE.

3. The computer-implemented method of claim 2, wherein assigning the pool of link resources further comprises oversubscribing the pool of link resources based on a network failure analysis.

4. The computer-implemented method of claim 1, in response to establishing the cross connects of each of the NEs of the working path, activating, by each of the NEs along the working path, cross connects of the working path into respective hardware associated with the NEs.

5. The computer-implemented method of claim 1, in response to establishing the cross connects of each of the NEs of the recovery path, storing, by each of the NEs along the recovery path, data indicating the cross connects into memory associated with the NEs.

6. The computer-implemented of claim 1, further comprising, activating, by the NEs along the recovery path, the cross connects of the recovery path into respective hardware associated with the NEs.

7. A system for pre-provisioning recovery paths in a mesh network, the system comprising:

a controller computing module configured to:
create i) a working path between a head end network element (NE) and a tail end network element of the mesh network and ii) a recovery path between the head end NE and the tail end NE, wherein the working path and the recovery path include one or more intermediate NEs;

provision the working path in an activated state, including establishing cross connects of each of the NEs of the working path;

provision the recovery path in a pending state, including establishing cross connects of each of the NEs of the recovery path;

configure a pool of link resources for each link between the NEs;

the head end NE configured to:
after provisioning the recovery path, detect a failure along the working path;

in response to detecting the failure along the working path, allocating and reserving link resources along the recovery path based on the pool of link resources for each link between the NEs of the recovery path, wherein allocating and reserving the link resources along the recovery path further includes:

transmitting, by the head end NE, an activation message on an outgoing link of the cross connect to a particular intermediate NE along the recovery path, the activation message including proposed link resources;

receiving, by the particular intermediate NE, the activation message, and in response, determining an availability of the proposed link resources;

transmitting, by the particular intermediate node, the activation message to the tail end NE;

receiving, by the tail end NE, the activation message, and in response, providing, to the particular intermediate node, an activation success message;

receiving, by the particular intermediate node, the activation success message, and in response, providing the activation success message to the head end NE; and receiving, by the head end NE, the activation success message; and wherein each of the NEs along the recovery path activate the cross connects of the recovery path into respective hardware associated with the NEs, wherein the activating is independent of the controller computing module interaction.

8. The system of claim 7, wherein the controller computing module is further configured to:

create, using the pool of link resources, multiple recovery paths between the head end NE and the tail end NE.

9. The system of claim 8, wherein assigning the pool of link resources further comprises oversubscribing the pool of link resources based on a network failure analysis.

10. The system of claim 7, in response to establishing the cross connects of each of the NEs of the working path, activating, by each of the NEs along the working path, cross connects of the working path into respective hardware associated with the NEs.

11. The system of claim 7, in response to establishing the cross connects of each of the NEs of the recovery path, storing, by each of the NEs along the recovery path, data indicating the cross connects into memory associated with the NEs.

12. The system of claim 7, further comprising, activating, by the NEs along the recovery path, the cross connects of the recovery path into respective hardware associated with the NEs.

* * * * *